(12) United States Patent  (10) Patent No.: US 8,860,885 B2
Choi  (45) Date of Patent: Oct. 14, 2014

(54) DISPLAY APPARATUS AND CONTROL METHOD THEREOF

(75) Inventor: Young-ho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 618 days.

(21) Appl. No.: 13/010,469

(22) Filed: Jan. 20, 2011

(65) Prior Publication Data

US 2011/0285909 A1 Nov. 24, 2011

(30) Foreign Application Priority Data

May 20, 2010 (KR) ........................ 10-2010-0047652

(51) Int. Cl.
*H04N 5/00* (2011.01)
*H04N 5/213* (2006.01)

(52) U.S. Cl.
CPC ..................................... *H04N 5/213* (2013.01)
USPC ............................ 348/607; 348/533; 348/618

(58) Field of Classification Search
USPC .................................................. 348/606–623
See application file for complete search history.

(56) References Cited

U.S. PATENT DOCUMENTS

| | | | | |
|---|---|---|---|---|
| 5,612,978 | A * | 3/1997 | Blanchard et al. | 375/350 |
| 6,040,876 | A * | 3/2000 | Pettitt et al. | 348/624 |
| 6,384,858 | B1 * | 5/2002 | Limberg | 348/21 |
| 7,686,083 | B1 * | 3/2010 | Emfinger | 166/298 |
| 8,237,863 | B2 * | 8/2012 | Jang | 348/572 |
| 2002/0030761 | A1 * | 3/2002 | Hibi et al. | 348/607 |
| 2006/0055832 | A1 * | 3/2006 | Lee | 348/735 |
| 2006/0221241 | A1 * | 10/2006 | Okumichi et al. | 348/571 |
| 2008/0225182 | A1 * | 9/2008 | Silver et al. | 348/726 |
| 2010/0283902 | A1 * | 11/2010 | Rashid et al. | 348/725 |
| 2011/0182338 | A1 * | 7/2011 | Li et al. | 375/224 |

* cited by examiner

*Primary Examiner* — Jefferey Harold
*Assistant Examiner* — Humam Satti
(74) *Attorney, Agent, or Firm* — Sughrue Mion, PLLC (57) ABSTRACT

The display apparatus includes a video receiver which receives a video signal from an external source; a video processor which processes the video signal received in the video receiver to be displayable on a display unit; and a noise processor which determines frequency position information of an interference signal component from a frequency domain of sync sections extracted from the video signal with regard to the interference signal component mixed in a predetermined frequency band of the video signal and causing noise in a display image displayed on the display unit, and compensates the display image based on the determined frequency position information.

22 Claims, 8 Drawing Sheets

DISPLAY APPARATUS AND CONTROL METHOD THEREOF

CROSS-REFERENCE TO RELATED APPLICATION

This application claims priority from Korean Patent Application No. 10-2010-0047652, filed May 20, 2010 in the Korean Intellectual Property Office, the disclosure of which is incorporated herein by reference in its entirety.

BACKGROUND

1. Field

Apparatuses and methods consistent with exemplary embodiments relate to a display apparatus which receives an analog video signal and displays the video signal as an image, and a control method thereof, and more particularly, to a display apparatus which displays a compensated image by removing noise from an image, and a control method thereof.

2. Description of the Related Art

A display apparatus may include a television (TV) or a monitor for a computer, which processes a video signal received from the external device by various video processes and displays the video signal as an image on a panel forming a display area. Recently, the display apparatus has been digitalized in processing a video signal. Accordingly, if the received video signal is an analog signal, such as a radio frequency (RF) signal, the display apparatus converts the analog signal into a digital signal.

When the video signal is processed and displayed as an image in the display apparatus, quality of an image may be deteriorated due to the noise. The noise in an image may be caused by an interference signal that is mixed with the video signal during reception and processing in the display apparatus or by an interference signal that is mixed with the video signal before the video signal is received in the display apparatus. The noise may affect the analog video signal more severely than a digital video signal. For example, in the case that an interference signal occurs in a specific frequency band of the RF video signal, the interference signal may appear as noisy oblique lines on a displayed image.

With recent remarkable increase in the number of broadcasting channels, a load to be processed in the display apparatus has also increased. However, the size of a control board of the display apparatus tends to decrease due to overall miniaturization and slimming of the display apparatus. Therefore, it is difficult to add a functionality of removing the noise to the display apparatus. Further, since video signals are different in characteristics according to geographic areas or nations, it is difficult to counter the noise by setting a frequency band at which the noise occurs in advance. Accordingly, there is a need for methods and apparatuses that provide good quality image by compensating the image for the noise occurring due to various conditions.

SUMMARY

Exemplary embodiments may address at least the above problems and/or disadvantages and other disadvantages not described above. Also, exemplary embodiments are not required to overcome the disadvantages described above, and an exemplary embodiment may not overcome any of the problems described above.

According to an aspect of an exemplary embodiment, there is provided a display apparatus including a video receiver which receives a video signal from an external source; a video processor which processes the video signal received in the video receiver to be displayable on a display unit; and a noise processor which determines frequency position information of an interference signal component from a frequency domain of sync sections extracted from the video signal with regard to the interference signal component mixed in a predetermined frequency band of the video signal and causing noise in a display image on the display unit and compensates a display image on the basis of the determined frequency position information.

The noise processor may individually transform each of the sync sections, periodically provided for a predetermined period of time in the video signal, to be in a frequency domain.

The noise processor may filter out random noise that occurs randomly, by averaging the frequency domains of the respective individually-transformed sync sections, and determine a center frequency and a bandwidth of the interference signal component from the averaged frequency domain.

The noise processor may individually apply fast Fourier transform (FFT) to the respective sync sections.

The noise processor may perform extraction by selecting preset one between a horizontal sync (H-sync) section and a vertical sync (V-sync) section.

The noise processor may remove an interference signal component having a center frequency and a bandwidth corresponding to the determined frequency position information from the video signal, and the video processor may process the video signal, from which the interference signal component is removed, to be displayable on the display unit.

The display apparatus may further include a user input unit, wherein the noise processor receives information about selection of whether to compensate the display image from the user input unit, and performs the image compensation selectively on the basis of the received information.

The video signal received in the video receiver may include an RF signal.

The video processor and the noise processor may be integrated as a system-on-chip (SOC).

According to an aspect of another exemplary embodiment, there is provided a control method of a display apparatus, the method including: displaying an image based on a video signal received from an external source; determining frequency position information of an interference signal component from a frequency domain of sync sections extracted from the video signal with regard to the interference signal component mixed in a predetermined frequency band of the video signal and causing noise in the image; and compensating the display image on the basis of the determined frequency position information.

The determining the frequency position information of the interference signal component includes individually transforming each of the sync sections, periodically provided for a predetermined period of time in the video signal, to be in a frequency domain.

The individually transforming each of the sync sections to be in the frequency domain may include averaging the frequency domains of the respective individually-transformed sync sections, and determining a center frequency and a bandwidth of the interference signal component from the averaged frequency domain.

The individually transforming each of the sync sections to be in the frequency domain may include individually applying an FFT to the respective sync sections.

The determining the frequency position information of the interference signal component may include performing extraction by selecting preset one between an H-sync section and a V-sync section.

The compensating the display image on the basis of the determined frequency position information may include removing an interference signal component having a center frequency and a bandwidth corresponding to the determined frequency position information from the video signal; and displaying an image based on the video signal from which the interference signal component is removed.

The compensating the display image on the basis of the determined frequency position information may include receiving information about selection of whether to compensate the display image; and displaying the image selectively compensated on the basis of the received information.

BRIEF DESCRIPTION OF THE DRAWINGS

The above and other aspects will become more apparent by describing in detail certain exemplary embodiments with reference to the accompanying drawings, in which.

DETAILED DESCRIPTION OF EXEMPLARY EMBODIMENTS

Below, certain exemplary embodiments are described in greater detail with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Figure 1:
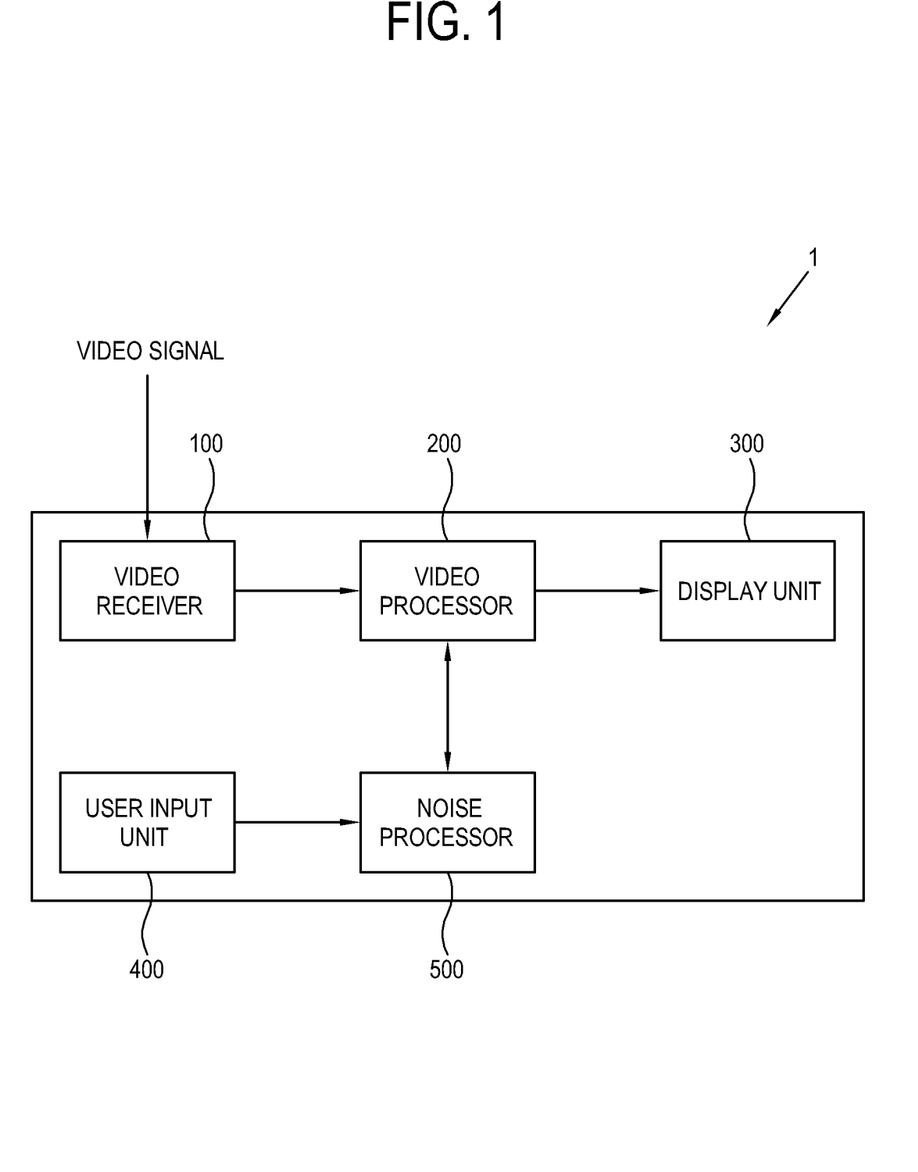
FIG. 1 shows a block diagram of a display apparatus according to an exemplary embodiment.

FIG. 1 shows a block diagram of a display apparatus 1 according to an exemplary embodiment. The display apparatus 1 in this exemplary embodiment includes a TV that receives an RF video signal from a broadcasting station and displays a broadcast image, but not limited thereto. Various display apparatuses, such as a monitor for a computer, which receives an analog video signal from the computer and displays it as an image, and the like may be used, and exemplary embodiments are not limiting.

As shown in FIG. 1, the display apparatus 1 includes a video receiver 100 to receive a video signal from the external source, a video processor 200 to process a video signal received by the video receiver 100 by various video processes, a display unit 300 to display an image based on a video signal processed by the video processor 200, a user input unit 400 to be manipulated by a user to perform an input preset for an operation of the display apparatus 1, and a noise processor 500 to compensate an image displayed on the display unit 300 by removing or filtering out an interference signal component mixed in a video signal processed by the video processor 200.

According to an exemplary embodiment, the noise processor 500 determines frequency position information of the interference signal component from a frequency domain of a sync section extracted from a video signal and filters out an interference signal component corresponding to the determined frequency position information from the video signal, with regard to the interference signal component mixed at a predetermined frequency band of the video signal and causing noise in an image.

The display apparatus 1 may filter out the interference signal component in accordance with a frequency characteristic even though the corresponding frequency characteristic of an interference signal mixed in a video signal is variable. Particularly, it is effective in filtering out the interference signal mixed in an analog video signal such as an RF signal.

Thus, noise of a displayed image can be removed even in a miniaturized display apparatus 1 and non-dependent on a specific characteristic of a video signal, thereby guaranteeing the quality of an image displayed on the display apparatus 1.

Below, elements of the display apparatus 1 are described in detail.

The video receiver 100 receives an analog or digital video signal from an external video source (not shown). The video receiver 100 may include various components to perform processing in accordance with formats of a video signal and types of the display apparatus 1.

For example, if the display apparatus 1 is a TV, the video receiver 100 may wirelessly receive an RF signal from a broadcasting station (not shown), or may receive a video of a composite video, component video, super video, Syndicat des Constructeurs des Appareils (SCART), high definition multimedia interface (HDMI), or etc. through a wire. In the case that a video signal is a broadcast signal, the video receiver 100 may include a tuner to be tuned to a channel corresponding to the broadcast signal.

If the display apparatus 1 is a monitor for a computer, the video receiver 100 may include components to perform processing according to various standards such as D-SUB for transmitting an RGB signal based on VGA, digital video interactive-analog (DVI-A) based on DVI, digital video interactive-integrated digital/analog (DVI-I), digital video interactive-digital (DVI-D), HDMI, or etc. Alternatively, the video receiver 100 may include a display port, unified display interface (UDI), wireless HD, etc.

The video processor 200 performs various video processes set in advance to process a video signal. The video processor 200 applies such processes to the video signal and outputs the processed video signal to the display unit 300, so that the display unit 300 displays an image.

There is no limit to the kinds of the video processes implemented in the video processor 200. For example, the video processes may include digital conversion for an analog video signal, demodulating for shifting a frequency of a video signal to a baseband, decoding corresponding to video and audio formats, de-interlacing, frame refresh rate conversion, scaling, detail enhancement, line scanning, etc.

The video processor 200 may include independent components for individually performing each of the video processes, or may include an SOC where many functions are integrated.

The display unit 300 may include a liquid crystal display (LCD) panel or a plasma display panel (PDP), and may display a video signal processed by the video processor 200 as an image. If the display unit 300 includes an LCD panel, a plurality of horizontal scan lines scanned by the video processor 200 is vertically arranged on a display area of the display unit 300, thereby displaying a video frame or a video field.

The user input unit 400 is manipulated by a user to generate a preset control signal related to the operation of the display apparatus 1 and to transmit the control signal to the video processor 200 or the noise processor 500. For example, the user input unit 400 may include a menu key provided externally of the display apparatus 1, or a remote controller in communication with the display apparatus 1.

The noise processor 500 analyzes a video signal processed by the video processor 200, and determines the frequency position information of the interference signal component, which causes noise, on the basis of the analyzed results. In this exemplary embodiment, the noise processor 500 is provided separately from the video processor 200, but not limited thereto. Alternatively, the noise processor 500 and the video processor 200 may be integrated into a single device. Detailed configuration of the noise processor 500 is described in below.

Below, a case where an interference signal is mixed in a video signal is described with reference to FIGS. 2A, 2B, 2C and 2D. FIGS. 2A, 2B, 2C and 2D show an example where an RF video signal is received in the video receiver 100 and processed by the video receiver 100 and the video processor 200 to be shifted to a baseband, in a frequency domain.

Here, the frequency domain refers to that a waveform of a predetermined signal which is represented with respect to a frequency. If the signal is represented in the frequency domain, the corresponding signal is represented by a relationship between a signal frequency and a signal strength. On the other hand, a time domain refers to that a waveform of a signal which is represented with reference to time. In the time domain, the corresponding signal is represented by a relationship between a signal in time and a signal amplitude.

FIGS. 2A, 2B, 2C and 2D show a signal of a predetermined broadcasting channel among the RF video signals, which is divided in accordance with respective processing steps, in the frequency domain. Although one broadcasting channel may include three signal components such as a video or brightness signal, a chroma signal, and an audio signal, FIGS. 2A, 2B, 2C and 2D show only the brightness signal and only a center frequency of the brightness signal for simplicity.

Figure 2A:
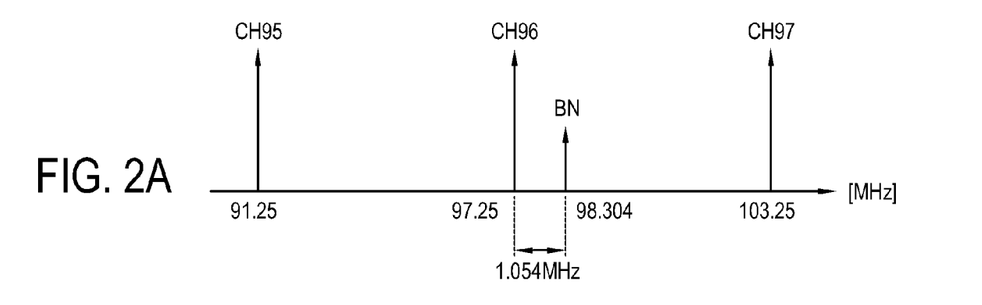
FIGS. 2A, 2B, 2C, and 2D show an example of a received video signal shifted to a baseband in a frequency domain, in the display apparatus of FIG. 1.

FIG. 2A shows a brightness signal corresponding to channels of a video signal having an RF band received in the video receiver 100. Since the signal is represented in the frequency domain, an abscissa indicates the frequency of the signal and an ordinate indicates the strength of the signal.

For example, FIG. 2A illustrates brightness signals corresponding to three channels CH95, CH96 and CH97. The center frequencies of these channels are 91.25 MHz, 97.25 MHz, and 103.25 MHz, respectively.

Figure 2B:
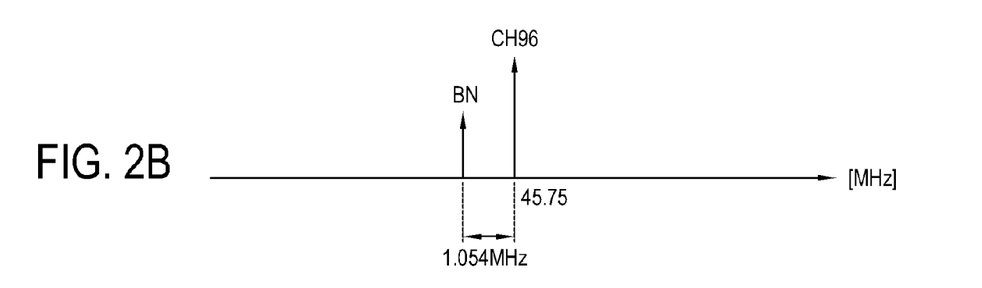

FIG. 2B shows an example in which the video receiver 100 shifts the video signal of channel CH96 from the RF band to an intermediate frequency (IF) band. The shift of the video signal to the IF band is implemented by mixing with a specific frequency output from a local oscillator of the video receiver 100. Thus, the brightness signal of CH96 having 97.25 MHz in the RF band is modulated down to 45.75 MHz in the IF band.

Figure 2C:
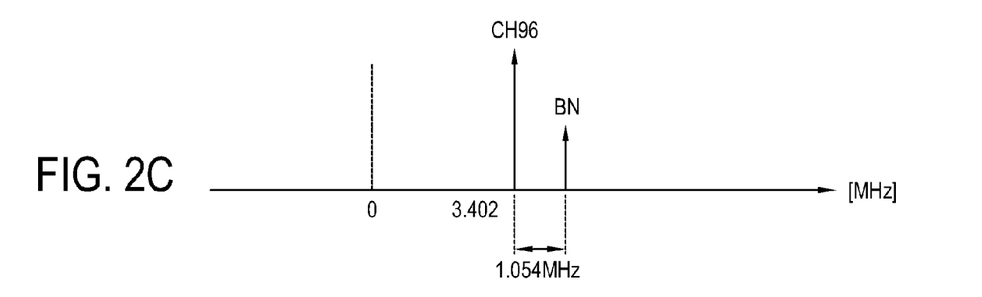

FIG. 2C shows an example in which the video signal shifted to the IF band is converted into a digital signal by the video processor 200, and thus shifted into an analog/digital converting (ADC) band. Accordingly, the brightness signal of CH96 having 45.75 MHz in the IF band is modulated down to 3.402 MHz in the ADC band.

Figure 2D:
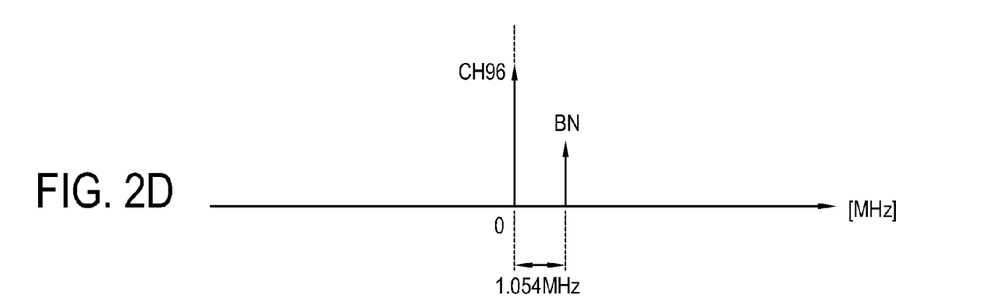

FIG. 2D shows an example in which the video signal in the ADC band is demodulated by the video processor 200 and thus shifted into the baseband. Therefore, the brightness signal of CH96 is demodulated to the baseband, and the demodulated brightness signal is decoded by the video processor 200 and undergoes a scaling process to be displayed as an image.

However, an interference signal component generated by various components of the display apparatus 1 may be mixed during the foregoing process into the video signal. For example, various frequency oscillators are applied to the frequency modulation process including the ADC process in the video processor 200. If the interference signal generated in the oscillator applied to the video processor 200 is reversed from the video processor 200 to the video receiver 100, a video signal is mixed with the interference signal.

Thus, the mixed interference signal component may remain during the processes shown in FIGS. 2A-2D, thereby causing noise in a finally displayed image.

For instance, if an interference signal of 49.152 MHz applied to the ADC process of the video processor 200 is introduced into the video receiver 100, an interference signal component BN of 98.304 MHz due to a multiplied component of 49.152 MHz may be generated in a video signal of an RF band as shown in FIG. 2A. The interference signal component BN makes a difference by 1.054 MHz from 97.25 MHz that is the center frequency of the brightness signal component corresponding to the channel of CH96.

Thus, in the state that the interference signal component BN is generated, the interference signal component BN has a difference of 1.054 MHz from the brightness signal corresponding to the channel of CH96 even though the video signal is shifted to the IF band, the ADC band and the baseband, and is not removed from the video signal.

Meanwhile, the interference signal may be mixed in the video signal by other causes as described below with reference to FIG. 3.

Figure 3:
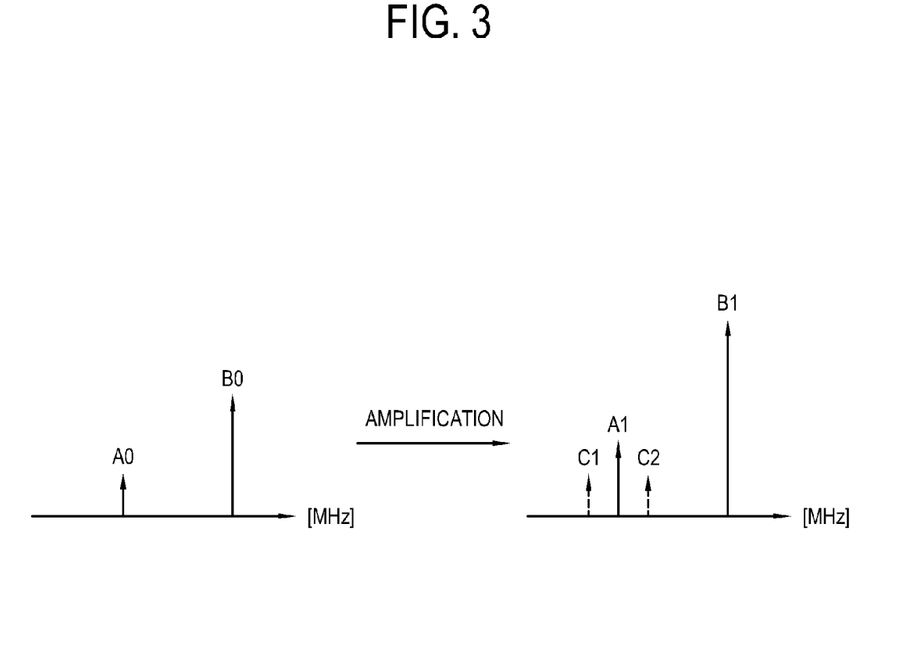
FIG. 3 shows an example of an interference signal generated when there is a large difference in signal strength between neighboring frequencies within a video signal, in the display apparatus of FIG. 1.

FIG. 3 considers an example of a video signal including a signal component A0 of a predetermined channel and a signal component B0 of a neighboring channel to the signal component A0 within a predetermined frequency, in the display apparatus 1.

The video receiver 100 and the video processor 200 include various amplifiers to amplify the signal strength. To secure the quality of a displayed image even though the video signal is amplified, such an amplifier may operate within the constraints of maintaining the characteristics of the signal linear.

If the video signal is amplified in the case that the signal component to be displayed as an image is the signal component A0 and the signal strength of the signal component B0 is substantially greater than that of the signal component A0, the strength of a signal component B1 amplified from the signal component B0 may be outside of the constraints of the linear characteristics of the signal. In this case, an interference signal component C1 or C2 is generated in a frequency band adjacent to the signal component A1 amplified from the signal component A0. The signal components C1 and C2 may cause noise to be generated in a displayed image.

The noise processor 500 removes the generated interference signal component from the video signal, thereby compensating the noise in a displayed image. Detailed configurations of the noise processor 500 according to an exemplary embodiment are described below.

Figure 4:
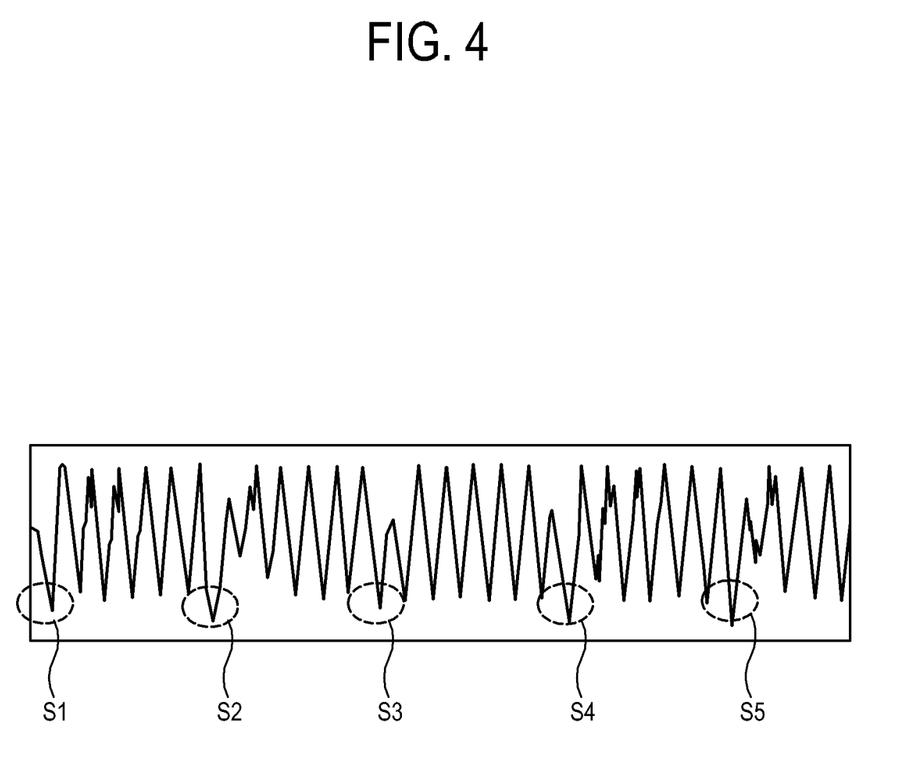
FIG. 4 shows an example of a waveform that a video signal processed in a video processor of the display apparatus of FIG. 1.

FIG. 4 shows an example of a waveform in which a video signal demodulated in the video processor 200 is sampled and represented in a time domain. Since FIG. 4 is shown in the time domain, an abscissa indicates time and an ordinate indicates a signal amplitude.

As shown in FIG. 4, the video signal has periodic sync sections S1, S2, S3, S4, and S5, and includes video data in sections between the sync sections S1, S2, S3, S4, and S5. In this exemplary embodiment, the sync sections S1, S2, S3, S4, and S5 are H-sync sections, but not limited thereto. Alternatively, an exemplary embodiment may use V-sync sections.

The noise processor 500 extracts the sync sections S1, S2, S3, S4, and S5 from the video signal, and transforms the extracted sync sections S1, S2, S3, S4, and S5 into a frequency domain. Further, the noise processor 500 may determine the frequency position information of the interference signal component from the frequency domain of the transformed sync sections S1, S2, S3, S4, and S5 and remove the interference signal component from the video signal by reflecting the determined results.

The reason why the noise processor 500 determines the frequency position information of the interference signal component from the sync sections S1, S2, S3, S4, and S5 is as follows. Even though the characteristics of the video signal may be different according to geographic areas or nations, video data is not included in any of the video signals in the sync sections S1, S2, S3, S4, and S5. Thus, in the case of a normal video signal, there is no interference signal component corresponding to a specific frequency in the sync sections S1, S2, S3, S4, and S5. On the other hand, if there is a signal component corresponding to a specific frequency in the sync sections S1, S2, S3, S4, and S5, a signal having the corresponding frequency is determined as the interference signal component that causes noise.

Thus, the noise processor 500 in this exemplary embodiment transforms the sync sections S1, S2, S3, S4, and S5 into the frequency domain, and determines the frequency position information of the interference signal component. For example, to specify the frequency of the interference signal component in the determining process, a random noise component that occurs randomly may be filtered out.

If the strength of the video signal is relatively great, the frequency of the interference signal component can be easily specified even though the random noise is not filtered out in the frequency domain of the sync sections S1, S2, S3, S4, and S5. It is possible to determine the frequency position information of the interference signal component from one of the sync sections S1, S2, S3, S4, and S5.

On the other hand, if the strength of the video signal is relatively small, it may be difficult to specify the frequency of the interference signal component due to the random noise in the frequency domain of one of the sync sections S1, S2, S3, S4, or S5. In this case, the random noise may be filtered out by the following processes.

The noise processor 500 individually transforms each of the sync sections S1, S2, S3, S4, and S5 from the video signal into the frequency domain. The number of sync sections S1, S2, S3, S4, and S5 to be individually transformed is not limited and may be variable. However, the fewer of the sync sections S1, S2, S3, S4, and S5 are transformed, the more difficult it is to filter out the random noise. On the other hand, the more of the sync sections S1, S2, S3, S4, and S5 are transformed, the greater is a processing load of the noise processor 500. Accordingly, the number of sync sections S1, S2, S3, S4, and S5 to be individually transformed may be set in consideration of the above-described trade-offs.

Various algorithms may be used for transforming the sync sections S1, S2, S3, S4, and S5 into the frequency domain. For example, the noise processor 500 may apply an FFT to each sync section S1, S2, S3, S4, or S5. The FFT is a kind of Fourier transform that transforms a signal from the time domain to the frequency domain. FFT is an improved algorithm to reduce computational quantities of a discrete Fourier transform that is a method of obtaining spectrum samples on frequency from a signal samples on time. The FFT is a well-known mathematical transform tool, and detailed descriptions thereof are omitted.

The reason why each of the sync sections S1, S2, S3, S4, and S5 is individually transformed into the frequency domain is as follows. In general, the random noise generated in the video signal tends to show Gaussian distribution if its sample is equal to or greater than a predetermined value. Thus, if the frequency domains of the respective sync sections S1, S2, S3, S4, and S5 are accumulated beyond a predetermined value and then averaged, the samples of the random noise showing Gaussian distribution are offset by each other, thereby filtering out the random noise.

With this principle, the noise processor 500 averages the frequency domains of the respective sync sections S1, S2, S3, S4, and S5 individually transformed as described above, and thus filters out the random noise component. If the random noise component is filtered out, the interference signal component is determined as shown by a graph 500 in FIG. 5.

Figure 5:
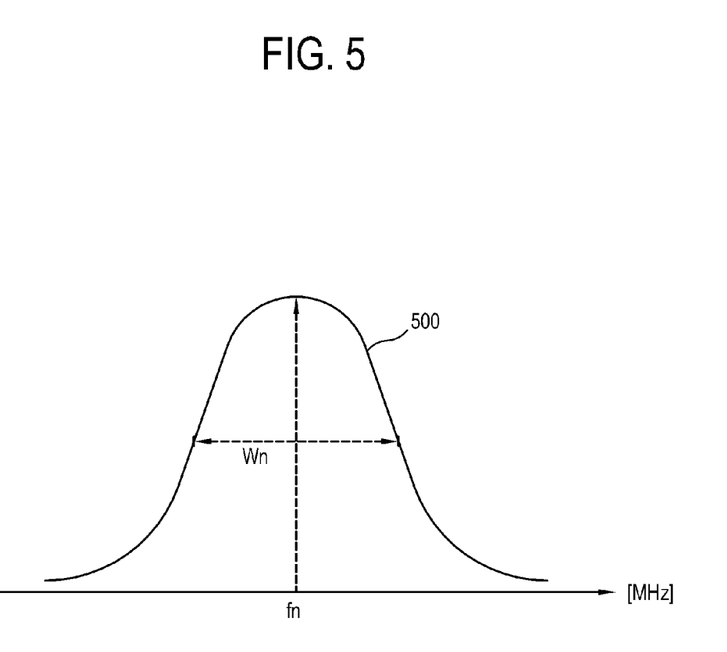
FIG. 5 shows an example of an interference signal determined from the video signal of FIG. 4 in a frequency domain.

As shown in FIG. 5, the noise processor 500 determines the frequency position information of the signal component in the frequency domain, from which the random noise component is filtered out, and more particularly a center frequency fn and a bandwidth Wn. The noise processor 500 determines that the determined center frequency fn and bandwidth Wn correspond to the interference signal component.

In brief, since the sync sections S1, S2, S3, S4, and S5 have no video data in the time domain of the video signal to be processed by the video processor 200, the noise processor 500 determines a signal as an interference signal that causes noise in a displayed image if there is the signal having a specific frequency in the frequency domain of the sync sections S1, S2, S3, S4, and S5.

However, besides the interference signal component, the random noise component may exist in the frequency domain of the sync sections S1, S2, S3, S4, and S5. Therefore, the noise processor 500 individually transforms each of the sync sections S1, S2, S3, S4, and S5 into the frequency domain and averages them to remove the random noise component and specify the interference signal component. Because the signal existing in the averaged frequency domain can be specified as the interference signal component, the noise processor 500 determines the center frequency fn and the bandwidth Wn of the corresponding signal as the frequency position information of the interference signal component.

When the frequency position information of the interference signal component is determined by the foregoing process, the noise processor 500 removes or filters out components corresponding to the determined center frequency fn and bandwidth Wn from an original video signal. To this end, various configurations may be used. For example, the noise processor 500 may include a parametric equalizer to remove a certain frequency band of a video signal.

The parametric equalizer is a configuration for varying and applying a frequency band, in the configuration of the notch filter that filters out a certain frequency band from a predetermined signal. That is, as described above, when the center frequency fn and the bandwidth Wn of the interference signal component are determined, the parametric equalizer removes the signal components of the center frequency fn and bandwidth Wn from the video signal, thereby filtering out the interference signal component from the video signal.

Figure 6:
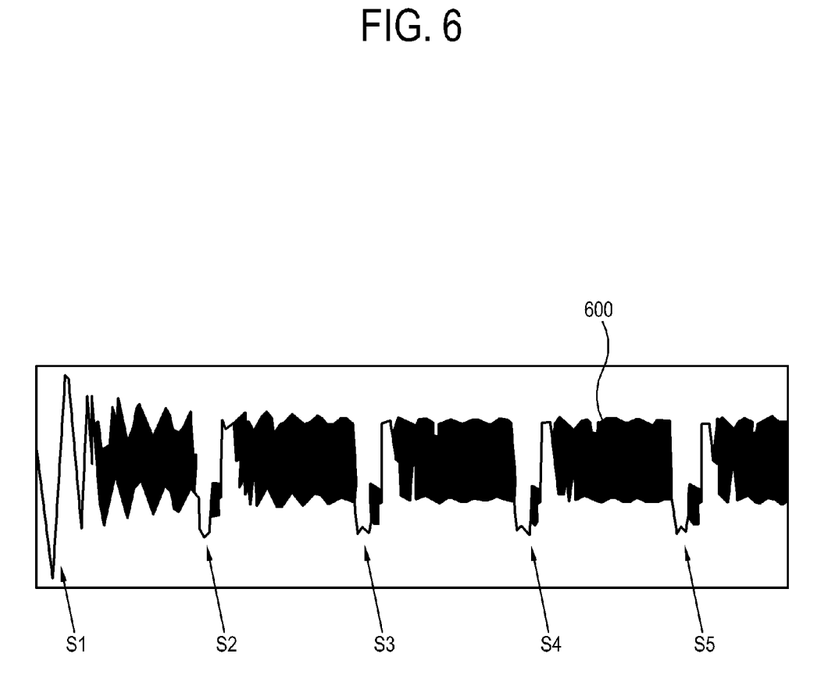
FIG. 6 shows an example of a waveform of a video signal acquired by removing the interference signal of FIG. 5 from the video signal of FIG. 4.

When the interference signal component is removed from the video signal, a waveform 600 may be acquired as shown in FIG. 6.

Referring to a comparison between FIG. 4 and FIG. 6 in the time domain, there is a difference in a waveform of a video signal as an interference signal component is filtered out from a video signal having a waveform distorted by an interference signal.

The video processor 200 performs the processes such as decoding, scaling, etc. with regard to the video signal filtered as described above, thereby displaying the video signal as an image on the display unit 300. Since the interference signal component is filtered out from the video signal, original image quality of a displayed image is secured with minimum noise.

As described above, the display apparatus 1 according to this exemplary embodiment determines the frequency position information of the interference signal component from the frequency domain of the sync sections S1, S2, S3, S4 and S5 of the video signal, and compensates a display image on the basis of the determined results. The interference signal component generated in a specific frequency band of the video signal by various causes is removed to thereby prevent noise from being generated in an image.

In an exemplary embodiment, the noise processor 500 performs the noise removing process in a step of modulating the video signal in the video processor 200, but not limited thereto. Alternatively, the noise removing process of the noise processor 500 may be performed in any step before decoding the video signal in the video processor 200.

Because the interference signal may be mixed with the video signal in any step among the steps of processing the video signal, it is possible to minimize mixing of the video signal and the interference signal if the noise process is performed in the demodulating step before decoding the video signal.

Figure 7:
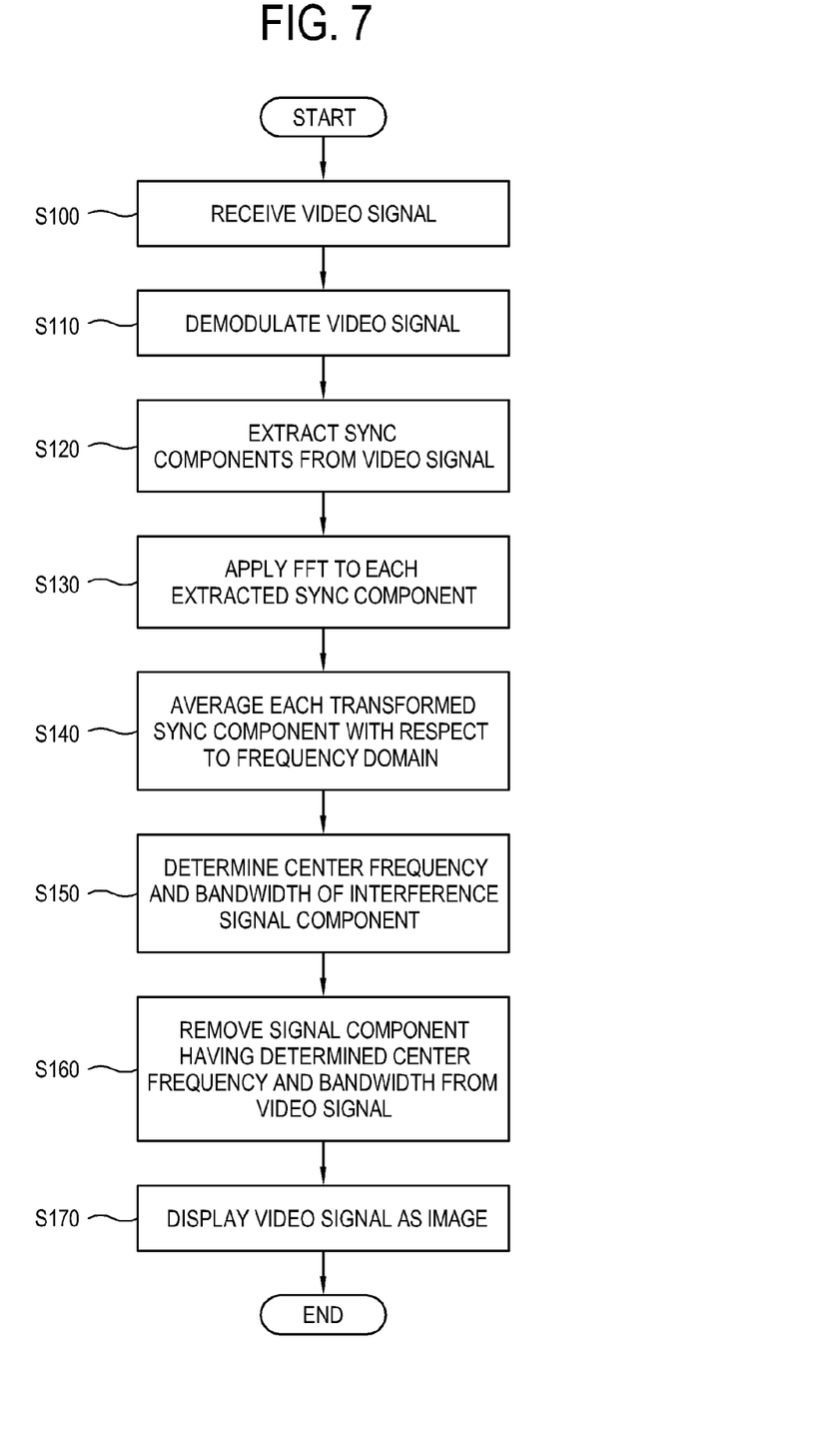
FIG. 7 is a control flowchart showing a noise compensation for an image displayed in the display apparatus of FIG. 1.

Below, a method of compensating a display image by filtering out an interference signal component from a video signal in the display apparatus 1 according to an exemplary embodiment is described in detail with reference to FIG. 7. FIG. 7 is a control flowchart showing this method.

As shown in FIG. 7, the display apparatus 1 receives a video signal (S100). The video receiver 100 is tuned to a video signal having an RF band, and the video processor 200 performs the ADC process and demodulates the video signal to a baseband (S110).

The noise processor 500 extracts a plurality of sync components periodically provided for a predetermined period of time from the demodulated video signal (S120). The noise processor 500 individually applies FFT to the respective extracted sync components, transforms them into the frequency domain (S130), averages the respective sync components transformed into the frequency domain to filter out random noise (S140).

The noise processor 500 determines a center frequency and a bandwidth of an interference signal component from the frequency domain from which the random noise is filtered out (S150), and removes the signal component of the determined center frequency and bandwidth from the demodulated video signal (S160).

The video processor 200 processes the video signal, from which the interference signal component is removed, and displays it as an image on the display unit (S170).

With this process, quality of an image can be compensated by removing noise from a display image of the display apparatus 1.

A user may select whether to implement the described noise compensation process for an image, as described below with reference to FIG. 8.

Figure 8:
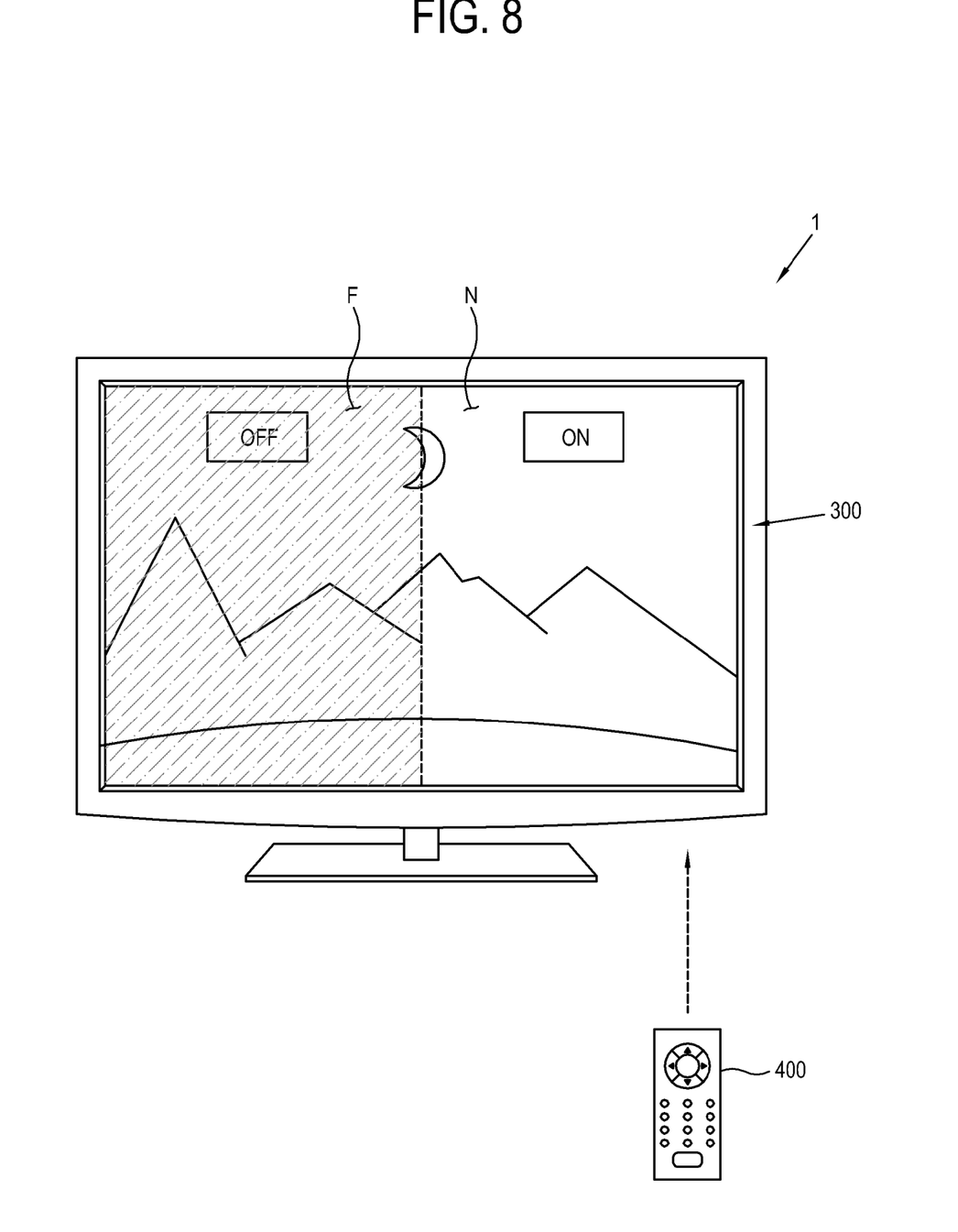
FIG. 8 shows an example of comparison between the display areas in which the noise compensation is performed and not performed with respect to an image displayed in the display apparatus of FIG. 1.

FIG. 8 shows an example of comparison between the display areas in which the noise compensation is performed and not performed with respect to an image.

As shown in FIG. 8, a user may select whether to compensate a display image by manipulating the user input unit 400 such as a remote controller or the like. Information about the selection is transmitted from the user input unit 400 to the noise processor 500, and the noise processor 500 may perform image compensation selectively on the basis of the received information.

A user may determine whether to select the image compensation by comparing between the cases where an image is compensated and not compensated. If a user inputs a preset input through the user input unit 400 so that a compensated image and an uncompensated image are displayed, the video processor 200 and the noise processor 500 may divide the display area of the display unit 300 into a compensated image area N and an uncompensated image area F, thereby displaying the compensated image and the uncompensated image on the areas N and F, respectively.

While the compensated image and the uncompensated image are displayed on the display unit 300, a user can select whether to compensate the image. For example, if there is a relatively great difference between the two images, a user may select the image compensation option to be performed so that the image can be displayed with enhanced quality. On the other hand, if there is a relatively small difference between the two images, a user may select not to perform the image compensation so that a system load can be prevented from increasing due to the operation of the noise processor 500.

In an exemplary embodiment, the compensated image area N and the uncompensated image area F symmetrically divide the display area into left and right portions, but not limited thereto. Alternatively, the compensated image area N and the uncompensated image area F may divide the display area into symmetrical upper and lower portions or asymmetrical portions, or one of them may be displayed in the form of picture-in-picture.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
   a video receiver which receives a video signal from an external source;
   a video processor which processes the video signal received by the video receiver to be displayable on a display unit; and
   a noise processor which determines frequency position information of an interference signal component from a frequency domain of sync sections extracted from the video signal with regard to the interference signal component mixed in a predetermined frequency band of the video signal and causing noise in a display image on the display unit and compensates the display image based on the determined frequency position information.

2. The display apparatus according to claim 1, wherein the noise processor individually transforms each of the sync sections, periodically provided for a predetermined period of time in the video signal, into a frequency domain.

3. The display apparatus according to claim 2, wherein the noise processor filters out random noise that occurs randomly, by averaging the frequency domains of respective individually transformed sync sections, and determines a center frequency and a bandwidth of the interference signal component from the averaged frequency domain.

4. The display apparatus according to claim 2, wherein the noise processor individually applies a fast Fourier transform (FFT) to respective sync sections.

5. The display apparatus according to claim 1, wherein the noise processor performs extraction by selecting one of a horizontal sync (H-sync) section and a vertical sync (V-sync) section.

6. The display apparatus according to claim 1, wherein the noise processor removes the interference signal component having a center frequency and a bandwidth corresponding to the determined frequency position information from the video signal, and
the video processor processes the video signal, from which the interference signal component is removed, to be displayable on the display unit.

7. The display apparatus according to claim 1, further comprising a user input unit,
wherein the noise processor receives information about selection of whether to compensate the display image from the user input unit, and compensates the display image selectively based on the received information.

8. The display apparatus according to claim 1, wherein the video signal received in the video receiver comprises a radio frequency (RF) signal.

9. The display apparatus according to claim 1, wherein the video processor and the noise processor are integrated as a system-on-chip (SOC).

10. A control method for a display apparatus, the method comprising:
displaying an image based on a video signal received from an external source;
determining frequency position information of an interference signal component from a frequency domain of sync sections extracted from the video signal with regard to the interference signal component mixed in a predetermined frequency band of the video signal and causing noise in the display image; and
compensating the display image based on the determined frequency position information.

11. The method according to claim 10, wherein the determining the frequency position information of the interference signal component comprises individually transforming each of the sync sections, periodically provided for a predetermined period of time in the video signal, into a frequency domain.

12. The method according to claim 11, wherein the individually transforming each of the sync sections comprises:
averaging the frequency domains of respective individually transformed sync sections; and
determining a center frequency and a bandwidth of the interference signal component from the averaged frequency domain.

13. The method according to claim 11, wherein the individually transforming each of the sync sections comprises individually applying a fast Fourier transform (FFT) to respective sync sections.

14. The method according to claim 10, wherein the determining the frequency position information of the interference signal component comprises performing extraction by selecting one of a horizontal sync (H-sync) section and a vertical sync (V-sync) section.

15. The method according to claim 10, wherein the compensating the display image comprises:
removing the interference signal component having a center frequency and a bandwidth corresponding to the determined frequency position information from the video signal; and
displaying the display image based on the video signal from which the interference signal component is removed.

16. The method according to claim 10, wherein the compensating the display image comprises:
receiving information about selection of whether to compensate the display image; and
displaying the display image selectively compensated based on the received information.

17. A method comprising:
receiving a signal comprising a video signal and periodically repeated sync sections;
extracting the sync sections from the signal;
transforming each extracted sync section into a frequency domain signal;
determining a center frequency and a bandwidth of an interference signal component mixed into the video signal from the transformed sync sections;
removing the interference signal component from the video signal based on the determined center frequency and bandwidth; and
displaying the video signal, from which the interference signal component is removed, on a display.

18. The method according to claim 17, further comprising:
averaging the frequency domain signals of respective transformed sync sections; and
determining the center frequency and the bandwidth of the interference signal component from the averaged frequency domain signals.

19. The method according to claim 17, wherein the sync sections do not comprise the video signal.

20. The display apparatus according to claim 1, wherein the interference signal component is an extraneous signal which is mixed into the predetermined frequency band adjacent to the frequency band of the video signal, and which corresponds to extraneous signals present in the frequency domain of the sync sections.

21. A display apparatus comprising:
a video receiver configured to receive a video signal from an external source;
a video processor configured to process the video signal received by the video receiver to be displayable on a display unit; and
a noise processor configured to determine frequency position information of an interference signal component from a time domain of sync sections, which are extracted from the video signal with regard to the interference signal component mixed in a predetermined frequency band of the video signal and causing noise in a display image on the display unit, and compensate the display image based on the determined frequency position information.

22. The display apparatus according to claim 1, wherein the noise processor is configured to remove random noise from the extracted sync sections and to determine a center frequency and a bandwidth of the interference signal component from the extracted sync sections from which the random noise has been removed.

* * * * *